June 23, 1970 — C. D. HINMAN ET AL — 3,516,744
SAMPLING ARRANGEMENT FOR LASER-RAMAN SYSTEMS
Filed May 20, 1966
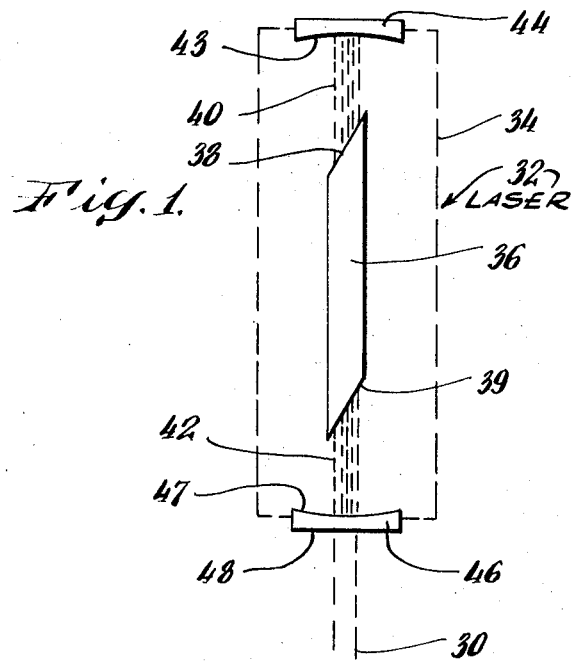
Fig. 1.    Fig. 2.
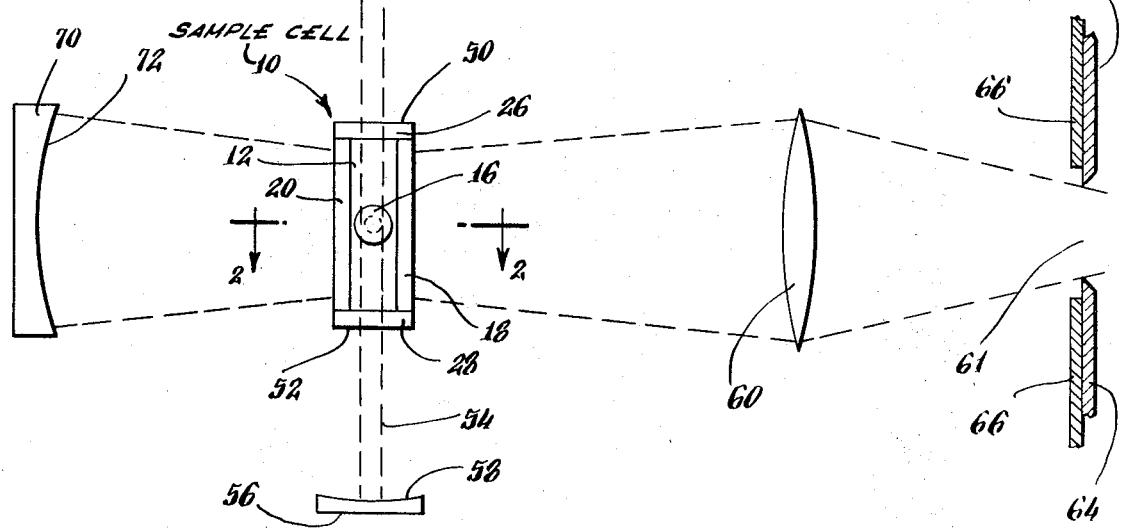
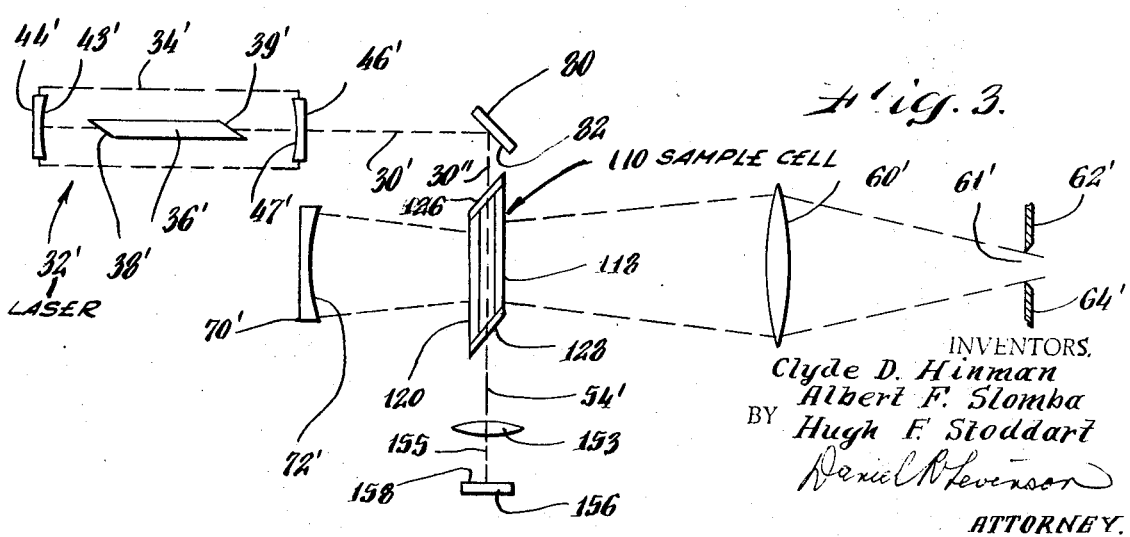
Fig. 3.
INVENTORS.
Clyde D. Hinman
Albert F. Slomba
BY Hugh F. Stoddart
Daniel R. Levinson
ATTORNEY.

United States Patent Office 3,516,744
Patented June 23, 1970

3,516,744
SAMPLING ARRANGEMENT FOR LASER-RAMAN SYSTEMS
Clyde D. Hinman, Wilton, and Albert F. Slomba, Ridgefield, Conn., and Hugh F. Stoddart, Groton, Mass., assignors to The Perkin-Elmer Corporation, Norwalk, Conn., a corporation of New York
Filed May 20, 1966, Ser. No. 551,685
Int. Cl. G01j 3/44
U.S. Cl. 356—75
10 Claims

ABSTRACT OF THE DISCLOSURE

This Raman spectrometer utilizes a laser as the excitation source. A beam-reversing mirror is positioned on the side of the sample cell remote from the laser so as to return radiation transmitted through the sample back to the laser. The end mirror of the laser nearer the sample will reverse most of this returned beam back through the sample again. Thus, the effective flux density through the sample is maintained at a substantially higher level than would be obtained by a single pass of the laser excitation beam.

---

This invention relates to Raman spectroscopy, and particularly to that part of a spectrometer in which the sample material undergoes monochromatic irradiation and in which the resulting (Raman) scattered re-radiation is collected.

The invention is characterized by an extremely high effective flux intensity of the exciting radiation within the sample volume. This is accomplished by multiple passage through the sample of the irradiating beam (which preferably originates from a continuous wave laser). More specifically the multiple passing of the irradiating beam may be caused by multiple reflections back and forth between a pair of effectively parallel high efficiency mirrors. In order to achieve the highest practical flux intensity per unit volume of sample (i.e., flux density), the volume actually contained in the sample is preferably elongated along the path of the laser beam and is only slightly larger in cross section than the beam. Such an arrangement has the subsidiary advantage of allowing the use of relatively small quantities of sample, while maintaining a relatively high intensity in the resultant Raman radiation. The Raman radiation is preferably collected along an axis making a substantial angle with the irradiating beam direction (for example at 90° thereto). The narrow cross section of the sample volume also simplifies the optical requirements of this Raman radiation gathering system.

An object of the invention is the provision of an improved sample irradiation and Raman radiation collecting system for a spectrometer.

Other objects of the invention include the provision of such a system having each of the following advantages, severally and collectively: high irradiation flux density, relatively high resulting Raman radiation, the ability to utilize small samples, relatively high efficiency in collection of the Raman re-radiation, and relatively high rejection by the collection system of the original exciting beam radiation.

Other objects and advantages of the invention will be obvious to one skilled in the art upon reading the following detailed description in conjunction with the accompanying drawings, in which:

FIG. 1 is a somewhat schematic side elevation of the inventive sampling system as utilized in a Raman spectrometer;

FIG. 2 is a horizontal sectional detail, taken along the lines 2—2 in FIG. 1; and FIG. 3 is a somewhat schematic side elevation of an alternative form of the invention.

In FIG. 1 a sample cell, generally shown at 10, contains the sample (assumed to be in liquid form, but which may also be gaseous) in its interior at 12. Such a cell is preferably elongated in the vertical direction, as seen in FIG. 1, but is of relatively small cross section, as seen in FIG. 2. Sample may be introduced into the interior 12 of the sample cell by means of one or more nipples 14, which subsequently may be closed, for example by stopper 16. At least substantial portions of the lateral walls 18, 20 of the sample cell are transparent, while the remaining two other transverse walls 22 and 24 (assuming the cell is of rectangular cross section) may be of any suitable material, transparent or not. The essentially square cross section of the cell (see FIG. 2) is not essential, but the cross section of the cell should preferably be quite small, and is most simply made either rectangular (including squares) or oval (including circular) in shape. The upper and lower plates 26, 28 forming the cell (see FIG. 1) are not only transparent, but preferably have their surfaces coated with an anti-reflection coating, as will appear hereinafter.

A laser beam 30 from a conventional optical maser, shown generally at 32, is caused to impinge upon and therefore be transmitted through, the upper transparent plate 26 of the sample cell. Laser 32 may be any pulsed or continuous wave laser, such as a helium-neon or other gas laser. Such a conventional gas optical maser is commercially available in the form of a substantially unitary cylindrical housing 34, within which everything except the electrical power supply may be contained. The gas which actually "lases" is normally contained within an interior generally cylindrical tube 36, having end windows which are typically at Brewster's angle, as indicated at 38 and 39. The gas within the inner cylinder 36 is electrically or optically "pumped" so that a large "population" of the atoms thereof are in a higher-than-normal energy level. The stimulated return of these members of the population from one higher energy level to a lower one causes the "lasing," as is now well understood. The resulting emission of the excess energy in the form of radiation will build up as a coherent monochromatic beam leaving both Brewster windows 38 and 39 as indicated generally at 40 and 42. The upper beam 40 will impinge upon an extremely high-efficiency reflecting surface 43 of mirror 44, which returns the beam back into the gas cavity at 36 with substantially no loss of intensity. The lower beam 42 impinges upon a front-surface mirror 46 of transmitting material, which also absorbs substantially none of the radiation; the front reflecting surface 47 is designed to allow a small part (like 2%) to be transmitted through the mirror so as to form external laser beam 30.

The two mirrors 44, 46 are assumed to be (for illustrative purposes) concave in almost "confocal" relationship (i.e., have facing concave surfaces having their principal focal points almost at a common point). This is one of the known arrangements in lasers, and is merely an exemplary laser configuration that may be utilized in the FIG. 1 embodiment. Because of the extremely high efficiency (i.e., extremely low absorption and transmission) of the upper end reflector 44, substantially all of the radiation produced will emerge in the main external laser beam 30. The lower surface of the somewhat transmitting lower end mirror 46 is treated with an anti-reflection coating 48. Such coatings, which cause the surface to have an extremely low reflection loss (in either direction) at least for radiation within a certain wavelength range, are now well known. Generally they consist of various layers of materials having a desired ratio of indices of refraction; the various layers are extremely thin, each being only a fraction of a wavelength thick. Since the laser radiation is almost perfectly monochromatic, such anti-reflection coatings can be also almost perfect at this one wavelength. As previously mentioned, the surfaces (such as 50 and 52) of the upper and lower windows 26, 28 of the sample cell are preferably coated in a similar manner.

The laser beam at 30 will therefore pass through the sample cell with extremely low reflection losses as well as only quite low absorption and (Rayleigh and Tyndall) scattering losses along this path, so that there is available very high exciting energy intensity in the sample to form the Raman radiation. The original laser beam will therefore emerge at only slightly less intensity as beam 54 below the sample cell. A beam reversal mirror 56 is provided to reflect the laser beam 54 (which otherwise would be wasted) back through the sample cell. If concave end reflectors (at 44 and especially at 46) are utilized in the laser, the beam reversal mirror 56 will preferably also have a concave reflecting surface at 58. Reflecting surface 58 should be of extremely high efficiency (i.e., the total losses from both absorption and transmission being extremely low). The reflecting surface 58 may be made (as may for example the concave surface of upper laser end mirror 44) by the use of known techniques, such as the use of multiple layers of extremely thin (fractional wavelength thickness) dielectric materials. The optical axis of the concave beam reversal mirror 56 is carefully aligned (i.e., made not only substantially parallel but also at least almost coincident) with the optical axis of the laser, as determined by the optical axes of end mirrors 44 and especially 46.

The radius of curvature of the reflecting surface 58 and the vertical position of mirror 56 is so chosen that the tendency for the laser beam to spread because of diffraction phenomena is effectively counteracted by the converging power of concave surface 58. Since as noted hereinafter, the laser beam will be repeatedly returned to and reflected by curved surface 47 of lower end mirror 46 (which surface is convex as "seen" from below), concave reflecting surface 58 should also counteract the divergent power of surface 47 on successive passes between these two surfaces. Surface 48 may also contribute some power (i.e., be convex) to counteract part of the divergent power of surface 47. Typically, concave surface 58 will have slightly more power (shorter radius of curvature) than surface 47, if surface 48 is plane. Beam reversal mirror 56 and lower laser end mirror 46 will thus cause the laser beam to be reflected back and forth with no substantial spread in its cross section. Because the undesirable reflection losses and the various transmission losses are relatively low, a large percentage of the intensity is maintained in each successive pass.

The cross section of the cell (as best seen in FIG. 2) is preferably quite small so as to allow both high exciting radiation flux density and relatively small sample quantities (which also assists in efficiently collecting the resulting Raman radiation, as will appear subsequently). Nevertheless the cell side walls 18–24 should preferably be completely outside of the laser beam path so as to avoid any scattering, reflection or transmission losses or other interference with the beam. This also preserves the plane polarization of the laser beam, which is important in polarization measurements. The so-far described parts of the apparatus therefore cause an extremely high flux density of irradiation illumination to be constantly present substantially throughout the entire sample volume. Thus the exciting radiation level (and therefore the Raman radiation intensity) is substantially greater than would be possible for a single pass of the laser beam. In one actual constructed embodiment the exciting radiation flux density was approximately ten times the original laser beam intensity (the flux density of a single pass system).

Because of the high flux density of the exciting radiation, a relatively high level of Raman scattered radiation will be produced from a small sample volume. This Raman radiation is collected by an optical system having its axis at a substantial angle (90° in the illustrated embodiment) to the optical axis of the exciting radiation system. In order to collect a large percentage of the Raman radiation, the collecting optical system should be relatively "fast" (i.e., the diameters of the optical elements thereof should be fairly large compared to the focal length); or stated in other words, the collection system should have a relatively large acceptance angle. In the illustrated embodiment this collection system comprises a relatively large, short focal length transfer lens 60 having conjugate focal planes at the (longitudinal center line of the) sample cell and the entrance slit of the monochromator utilized to analyze the intensity of the radiation at various wavelengths. Since the radiation of interest in Raman spectroscopy covers a relatively small wavelength range, a transfer lens 60 can be of relatively inexpensive design, despite its large relative aperture (since chromatic aberration and the other unwanted effects of "color" are not a serious problem). Lens 60 need not be a single element as shown in FIG. 1.

The lens 60 and the monochromator are so positioned relative to the sample cell 10 that the distances of conjugate focal plane of the object (i.e., sample) to the left of lens 60 and the image conjugate plane to the right (i.e., the position of the entrance slit 61 of the monochromator) correctly match the image size to the "height" of the monochromator slit. The entrance slit 61 of the monochromator is somewhat schematically represented by upper and lower "vertical" slit jaws 62, 64, schematically illustrated as supported by an apertured plate or housing 66; these slit jaws are usually fixed but may in fact be made adjustable in various well-known ways. The horizontal slit jaws (not shown) typically are adjustable to vary the slit width.

To assist in collecting Raman radiation which may leave the sample area in a direction opposite to that of transfer lens 60, a concave condensing mirror 70 is preferably provided in the position shown. The concave reflecting front surface 72 of this mirror should be so curved as to return the Raman radiation impinging thereon substantially back in the same direction (i.e., to the point from which it originated). For example, if surface 72 is spherical, the mirror would be placed so that the sample volume is at twice the distance of the mirror's focal length (i.e., at the center of curvature). Since mirror 70 causes the Raman radiation which leaves the sample area in the "wrong" direction to be returned substantially to its point of origin, such radiation will be collected by transfer lens 60 in the same manner as if it had originally started in the "right" direction.

The particular orientation of the Brewster windows (38, 39) of the laser shown in FIG. 1 will cause the electric vector of the plane-polarized light from the laser to vibrate horizontally in the plane of paper. The collection of Raman radiation should be made at right angles to this vibration direction, at least where polarization measurements are desired. Therefore, the exact relationship shown in FIG. 1 would not normally be used in an instrument. To insure the proper relationship of the laser polarization plane and the collecting optics, either the laser should be rotated 90° about its own longitudinal (vertical) axis from the position shown in FIG. 1, or all of the collecting optics (60–72) should be rotated 90° about this same vertical axis (e.g., with mirror 70 directly behind, lens 60 and the monochromator directly in front of, the sample cell). Since illustration of the exact correct relationship would either hide the slanted nature of the Brewster windows or obscure most of the collection elements, FIG. 1 has been intentionally drawn to best show these structural relationships so as to include this inaccuracy in the exact angular orientation. If all of the side walls of the sample cell are not transparent (although this is preferable), obviously at least the walls facing the collection elements (60–72) should be, regardless of the manner in which the correct relationship of the axis of the collecting optics and the Brewster windows of the laser is effected.

Since the operation of the FIG. 1 (and FIG. 2) device has been mostly described already, this will be merely briefly summarized. After the (say, liquid) sample substance has been introduced into the cell and the stopper 16 replaced, the sample cell will be positioned as indicated in FIG. 1, and the laser 32 turned on. The laser beam 30 will be reflected back and forth between the beam reversal mirror 56 and the laser end mirror 46 (or more specifically between concave reflective surface 58 and convex reflective surface 47). The flux density between these two mirrors (and therefore in the sample volume) will thus reach a relatively high value, limited only by the available power of the laser and the relatively low losses in the system (including of course the actual Raman scattering itself). A large proportion of the resulting Raman radiation (namely, that making only moderate angles with the horizontal in FIG. 1) will be collected by the transfer lens 60 (either directly or with the assistance of the backing mirror 70) so as to be introduced into the entrance slit 61 of the monochromator. The wavelength drive of the monochromator will be "scanned" (i.e., slowly varied) through a relatively narrow wavelength range on either (usually the upper or Stokes region) or both sides of the wavelength of the exciting radiation. The monochromator will provide a readout of the intensity of the radiation versus the wavelength through this range (typically in the form of a paper chart graph).

The inventive sampling system just described provides all of the advantages previously mentioned. Because of the relatively high flux density of the exciting radiation within the sample volume, a relatively large amount of Raman radiation is produced, thereby both facilitating its measurement and increasing precision and accuracy thereof. Because of the right-angle relationship between the irradiation beam and the collecting optics (60, 70), very little of the original exciting radiation reaches the monochromator slit 61. In order to maximize this elimination and to allow good depolarization measurements, the laser beam cross section should preferably the slightly smaller than the cross section of the sample volume 12, as indicated in both FIGS. 1 and 2, thereby eliminating any scattering of the exciting beam by the walls of the cell. To avoid any back-scattering of radiation indirectly reaching walls 22 and 24, these too are preferably made transparent. Since the laser beam must necessarily go through the end windows 50 and 52 of the sample cell, there will be some slight scattering by these windows. Preferably the field of view of the transfer lens 60 is chosen so as to exclude radiation originating from these plates as indicated in FIG. 1. The invention therefore provides a relatively high level of Raman radiation while avoiding any substantial collection of the intense original exciting radiation beam.

An alternative embodiment of the invention is illustrated in FIG. 3. In FIG. 3 the laser is illustrated at 32'. Except for its position and orientation, laser 32' in FIG. 3 may be identical to laser 32 of FIG. 1. A diagonal mirror 80 is placed on the optical axis of the laser at, say, 45°. The front surface 82 of this mirror will comprise an ultra high efficiency reflective coating of the type previously mentioned. The angle at which the mirror is intended to be used (say, 45°) should be taken into consideration when the layers are originally placed on the surface. The laser beam 30' will therefore be reflected through a 90° angle so as to leave mirror 80 in the same downward direction as the original laser beam in FIG. 1. The reflected laser beam at 30" will enter the sample cell 110, which is of different construction than that shown in FIG. 1, as will appear hereinafter. The transmitted laser beam 54' will be focussed by a lens 153 to its focal point 155. A plane front-surfaced reflector 156 is positioned in the beam so that its ultra high reflecting surface 158 is in the focal plane 155 of lens 153. Reflective surface 158 is preferably of the same layered coating type previously mentioned (as used at 82, 58, etc.). The positioning of lens 153 so that the laser beam is focussed on the reflective surface 158 causes these elements to act as an autocollimator, thereby returning the laser beam in the same direction from whence it came. This particular relationship facilitates alignment of the exciting radiation optical paths, and minimizes or even eliminates adjustment of the various optical elements when one or more must be replaced. This is particularly useful when using the apparatus with different sample cells, which may be inadvertently aligned somewhat differently, and even have slightly different optical properties (for example the upper and lower windows of the sample cell may not be identical or may be canted slightly from the exact desired angle). Lens 153 should incorporate sufficient converging dioptric power to focus transmitted beam 54' on reflective surface 158 despite any divergency caused by the convexity (see from the right) of mirror 46' during successive passes.

A comparison of FIG. 3 to FIG. 1 will show that the former is in a somewhat "neater" configuration, in that the device is nowhere near as tall and the laser is in a more conventional horizontal attitude. For this reason a tilted mirror, corresponding to 80 in FIG. 3, may be placed in the laser beam path 30 in FIG. 1, and laser 32 then positioned as shown at 32' in FIG. 3. Thus the illustrated position of the laser 32 in FIG. 1, although more simply illustrating the optical alignment of the exciting radiation part of the system, may be advantageously replaced by the folded path arrangement of FIG. 3.

Not only may either laser configuration (FIG. 1 or FIG. 3) be utilized in a particular apparatus, but also either the beam reversal mirror 56 of FIG. 1 or the autocollimator elements 153, 156 of FIG. 3 may be utilized in either type of instrument. Thus any particular apparatus may use either laser configuration and either type of beam-returning means so that FIGS. 1 and 3 taken together may be considered to illustrate these various combinations.

The Raman radiation collection system of FIG. 3 is essentially identical to that of FIG. 1, comprising a transfer lens 60' for gathering and focussing Raman radiation from the sample cell into the entrance slit 61' of the monochromator, and a backing mirror 70' for returning much of the Raman radiation which would otherwise be lost to the left, back through the sample cell and lens 60' to the monochromator entrance slit 61'. It may be noted that all of the elements designated by reference numerals below 80 in FIG. 3 are primed, and are substantially identical to those elements in FIG. 1 which have corresponding, unprimed) reference numerals. Thus the elements so far described in FIG. 3 differ from those in FIG. 1 only in the presence of the tilted mirror 80 (and the change in position of the laser) and the different type of beam reversal means utilized below the sample cell.

The sample cell itself is the other, and perhaps most major, difference between FIG. 3 and FIG. 1. In FIG. 3 the sample cell 110 may comprise four planar vertical walls enclosing the sample volume, at least one opposing pair (118, 120) of such walls being transparent. Thus a horizontal cross section through the center of sample cell 110 would appear much like that shown in FIG. 2 for sample cell 10. The left and right transparent walls 118, 120 of cell 110 (corresponding to elements 18 and 20 in FIG. 2) are however vertically offset relative to each other so as to be in the relationship as seen in FIG. 3 of opposite sides of a parallelogram. The front and back vertical walls (corresponding to elements 22, 24 in FIG. 2) have upper and lower edges along lines forming the shorter sides of a similar parallelogram. Thus these four walls will define a hollow parallelopiped. Specifically the upper edges of the four plates will define a plane which is canted relative to the laser beam direction 30″ in FIG. 3, at an angle equal to Brewster's angle, so that the upper transparent plate 126 closing this end of the cell is at Brewster's angle. Similarly the lower edges of these four plates will cause the lower transparent window 128 to be held at the same angle. Thus these two windows are both at Brewster's angle, and as shown are parallel.

As is well known, smooth planar surfaces of dielectric material at Brewster's angle exhibit no reflection in one of the two polarization planes, and are therefore 100% transmitting as to plane polarized light in this particular plane. This principle is of course utilized in the end windows of the laser itself (i.e., at 38, 39). In fact the use of such Brewster windows in a laser causes the laser beam to be plane polarized. This occurs since the great number of passes of the beam between the two resonant reflectors (such as 44 and 46) causes the Brewster windows 38, 39 to eliminate by reflection some of the radiation generated except for that radiation which is polarized in the particular plane. The large number of passes through these effectively polarizing "filters" causes the finally emerging beam at 30 (or 30′) to consist substantially solely of radiation "vibrating" in a single plane (i.e., be plane polarized).

Since the laser beam is already plane polarized, care should be taken that the upper and lower transparent windows 126, 128 in the FIG. 3 sample cell should be correctly oriented so as to be 100% transmitting as to the same plane that the light from the laser has been polarized. In other words, excluding the effect of the tilted mirror 80, the most obvious correct orientation would be for the upper and lower windows (126, 128) of the cell to be exactly parallel to the similar Brewster windows (38, 39) of the laser. Another, less obvious, but nevertheless equally acceptable arrangement would be with the sample cell (or the laser) to be rotated about its longitudinal axis exactly 180° from the just-mentioned position. This relationship is optically equivalent since the relationship between the plane of polarization of the laser beam and the canted Brewster windows is the same. Thus if the sample cell 110 is utilized in the FIG. 1 arrangement (which is one of the intended possible combinations) the Brewster windows of the cell (126, 128) may be either exactly parallel to the Brewster windows 38, 39 of the laser, or alternatively either the laser or the sample cell may be rotated exactly 180° about the vertical axis in FIG. 1 so that the two pairs of Brewster windows are "antiparallel." In fact, any one or more of the four Brewster windows (38, 39, 126, 128) may be "antiparallel" (rather than parallel) relative to the other windows. The presence of the tilted mirror 82 in the FIG. 3 form causes no additional problems, since the effect is merely to reverse the plane of polarization end for end; this is optically equivalent to rotating the laser beam through 180°, which has no significant effect, as just explained.

As previously noted with respect to FIG. 1, the actual shown position of laser 36′ in FIG. 3 will cause the electric vector of the plane polarized light to be in the plane of the paper (namely, vertically therein before and horizontally after reflection by mirror 80). This will cause the collection optics to "see" the light with the electric vector head-on, which is extremely undesirable as previously noted. Therefore in this FIG. 3 embodiment also, in an actual instrument the laser (and in this case the cell as well, in order to preserve the correct parallel or antiparallel relationship between the various Brewster windows) should actually be rotated 90° about on their own axis (causing the electric vector to be perpendicular to the plane of the paper both before and after reflection at mirror 80). Alternatively the collection optics (60′, 61′, 70′) may be rotated 90° about the central vertical axis of sample cell 110, so that backing mirror 70′ would be behind and lens 60′ and the monochromator (represented by its entrance slit 61′) in front of the sample cell, or vice-versa. The incorrect showing was chosen since a correct view would either obscure the cell (and the relationship of the various collecting optics) or not indicate the tilted nature of the various Brewster windows (in this case of both the laser and the sample cell).

As previously noted any one or more of the various subassemblies in FIG. 3 may be substituted for the corresponding sub-assemblies in FIG. 1 (or vice versa). Thus the folding mirror 80 and horizontal laser position may be used in either form, either the sample cell 10 having antireflective coatings on its upper and lower plates or the sample cell 110 with Brewster angle windows may be utilized in either form, and finally either a concave beam reversal mirror 56 or an autocollimating catadioptric system (i.e., lens 153 and plane mirror 156) may be used as the beam reversal means in either embodiment. Indeed both forms of either the sample cell or the beam reversal means or both may be supplied with each complete Raman spectrometer.

One illustrated version (FIG. 1) uses a concave mirror as the combined beam reversal and beam-spread limiting means, and the other version (FIG. 3) uses a plane mirror as the actual reversal means and a converging lens 153 as the beam-spread limiter. It is however possible to use a combination (for example a weak lens and a very weakly convergent mirror). In fact, a converging lens between the laser and the sample cell (i.e., above upper window 26 or 126) can profitably be used to diminish the beam cross section at the most critical location, i.e., when actually passing through the sample. This is particularly useful with extremely small sample cells. The lower reflecting surface may then not only be either concave or flat, but even very silghtly diverging (i.e., convex as seen from above). In most practical embodiments the lower beam reversal reflector (such as 56, 156) should preferably be quite close to the bottom (28, 128) of the cell, so as to restrict the unnecessary part of the optical path length (and therefore the tendency to spread). In fact, this beam reversal mirror may be directly incorporated on the lower surface 52 of the cell itself. In such case "window" 28 would have the correctly shaped lower surface (e.g., concave upwardly), and the reflector would be a reflecting coated layer applied directly thereto. The beam spread limiting means may comprise the same (concave) surface as the beam reversal reflector (as at 56, 58); one or more auxiliary lenses placed below the sample cell (as at 153), above the sample cell, or some above and some below; or a combination of one of more lensatic elements in conjunction with some dioptric power of the beam reversal reflector. Thus the two types of laser beam spread limiters and beam reversal means shown in FIG. 1 and FIG. 3, respectively, are only exemplary of various other useful combinations.

Because of the various alternatives herein taught, the invention in its broader aspects is not limited to any one of the particular sub-assemblies or any of the details thereof. Rather the invention is solely defined by the scope of the appended claims.

What is claimed is:
1. A sampling arrangement for Raman spectroscopy comprising:
    a laser source including a pair of end mirrors for producing a beam of monochromatic exciting radiation;
    means for holding a sample material at a sample location in the path of said exciting radiation beam;
    beam reversal means on the side of said sample holding means remote from said laser source, and in substantial optical alignment with said source and said sample location,
    said beam reversal means comprising an extremely efficient reflective means, effectively normal to said ex- citing beam so as to return said beam at substantially full intensity back to said sample location;

that laser end mirror which is nearer said sample thereby receiving and reversing back again at least a substantial part of the exciting radiation returned through said sample location by said beam reversal means, whereby a large part of said exciting radiation beam passes repetitively back and forth between said beam reversing means ad said nearer laser end mirror along substantially the same longitudinal path through said sample location, so as to build up a large exciting radiation flux density therein;

and means for collecting at least a substantial part of the resulting Raman radiation from the sample, the radiation acceptance axis of said collecting means being at a substantial angle relative to said longitudinal path of said exciting radiation beam, whereby any appreciable collection of the exciting radiation is avoided.

2. The Raman sampling arrangement of claim 1, in which:

beam-spread limiting means are present in the exciting radiation beam path between said nearer laser end mirror and said beam reversal means, inclusive, so as to be encountered at least once upon each said back and forth passage of said exciting beam, whereby spreading of the cross-sectional area of said exciting radiation beam during successive passes is effectively counteracted.

3. The Raman sampling arrangement of claim 1, in which:

at least said nearer laser end mirror is curved so as to have dioptric power;

and said beam reversal comprises at least one optical element having focal power of opposite sign, so as to counteract, at least in part, the spreading effect of said nearer laser end mirror dioptric power upon said exciting radiation beam during successive back and forth passes thereof.

4. The Raman sampling arrangement of claim 3, in which:

said nearer laser end mirror is convex as viewed in the direction of the exciting radiation returned by said beam reversal means.

5. The Raman sampling arrangement of claim 4, in which:

said beam reversal means comprises a concave reflective surface.

6. The Raman sampling arrangement of claim 4, in which:

said beam reversal means comprises a positive converging refractive element and a reflective surface, positioned substantially at the focal plane of said refractive element, whereby said first beam reversal means comprises an autocollimator, returning said exciting radiation beam directly back in a direction parallel to its original incident path, even in the presence of slight alignment errors of at least said refractive element.

7. The Raman sampling arrangement of claim 1, in which:

said reflecting means of said beam reversal means comprises a surface treated with a coating comprising extremely thin layers of dielectric material.

8. The Raman sampling arrangement of claim 1, in which:

at least those transmitting parts of said sample holding means through which said exciting radiation beam repetitively passes comprise anti-reflection means, whereby the transmission efficiency of said sample holding means is extremely high.

9. The Raman sampling arrangement of claim 8, in which:

said anti-reflection means comprise coatings of extremely thin layers of dielectric material.

10. The Raman sampling arrangement of claim 8, in which:

said exciting radiation beam comprises substantially plane-polarized radiation, and said transmitting parts of said sample holding means comprise windows, set at Brewster's angle and so oriented relative to the plane of polarization of said exciting beam as to be substantially perfectly transmitting.

References Cited

UNITED STATES PATENTS

| 3,218,913 | 11/1965 | Kaestner | 88—14 |
| 3,442,591 | 5/1969 | Oqura | 356—75 |

FOREIGN PATENTS

| 1,001,104 | 8/1965 | Great Britain. |

OTHER REFERENCES

Weber et al.: "High-Resolution Raman Spectroscopy of Gases with cw-Laser Excitation," Journal of the Optical Society of America, vol. 57, number 1, January 1967, pp. 19–28.

Leite et al: "Continuous Photoelectric Recording of Raman Effect in Liquids Excited by the He-Ne Laser J.O.S.A., vol. 54, number 8, August 1964, pp. 981–983.

Chiao: "Brillouin Scattering in Liquids Excited by the He-Ne Maser," J.O.S.A., vol. 54, number 10, October 1964, pp. 1286 and 1287.

Russell: "Raman Spectroscopy Using a Gas Laser," Le Journal De Physique, vol. 26, number 11, Nov. 1965, pp. 620–626.

RONALD L. WIBERT, Primary Examiner

F. L. EVANS, Assistant Examiner

U.S. Cl. X.R.

331—94.5; 356—103